July 10, 1962 C. POST 3,043,455
PORTABLE BUNK FEEDER
Filed June 11, 1959 4 Sheets-Sheet 1

CLARENCE POST
INVENTOR.

BY Lucas J. DeKoter
HIS ATT'Y

July 10, 1962

C. POST 3,043,455

PORTABLE BUNK FEEDER

Filed June 11, 1959

4 Sheets-Sheet 2

CLARENCE POST
INVENTOR.

BY
HIS ATT'Y

July 10, 1962 C. POST 3,043,455
PORTABLE BUNK FEEDER
Filed June 11, 1959 4 Sheets-Sheet 3
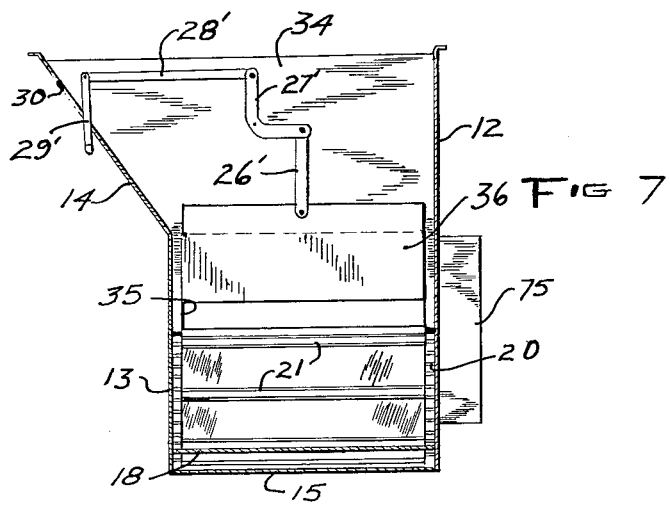
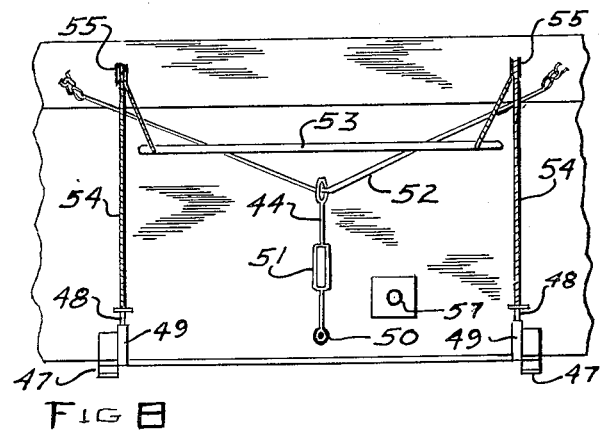
CLARENCE POST
INVENTOR.
BY
HIS ATT'Y

CLARENCE POST
INVENTOR.

United States Patent Office 3,043,455
Patented July 10, 1962

3,043,455
PORTABLE BUNK FEEDER
Clarence Post, Rock Valley, Sioux County, Iowa
Filed June 11, 1959, Ser. No. 819,633
6 Claims. (Cl. 214—83.36)

This invention pertains to animal feed conveyors or dispensers and more particularly to a dispenser for attachment to a farm tractor adapted to deposit animal feed in troughs or bunks.

In recent years with the increased number of livestock being fed on farms, and the recent emphasis on labor saving devices, many devices have been proposed which have as their principal purpose, the carrying of animal feed from a silo, bin or the like to a feed bunk or trough. Many of these devices have used as their principal conveyor an auger in a tube or trough adapted to move the feed through the tube to the bunk. These devices are relatively expensive for the farmer who does not feed a large number of livestock. They are also inconvenient for the farmer who feeds silage from a pit silo or the like, or where the location of the feed bunks may be changed within a feed lot.

It is my purpose, therefore, and one of the principal objects of my invention to provide a mechanical means of distributing animal feed onto a feed bunk or trough which is less expensive and more convenient in use than prior conveyors.

A further object of my invention is to provide a means of distributing feed to a feed bunk in which a proper mixture of feed may be delivered conveniently.

Still another object of my invention is to provide a means for distributing feed in which the proportions of mixture of two types of feed may be easily variable.

Figure 1:
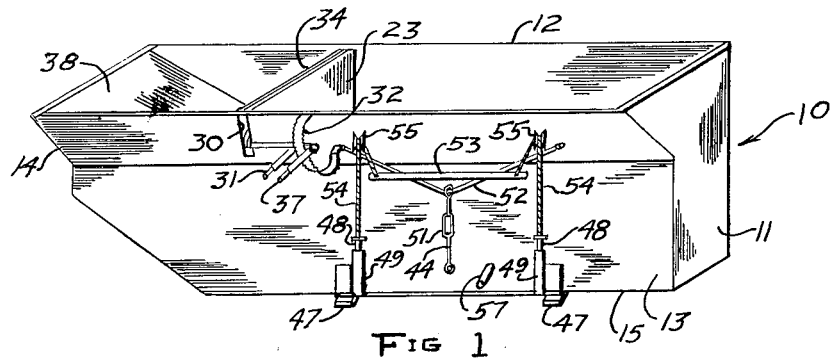
Figure 2:
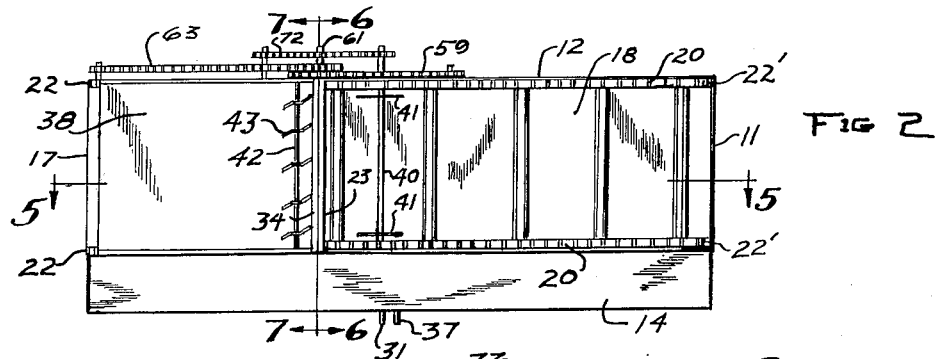
Figure 3:
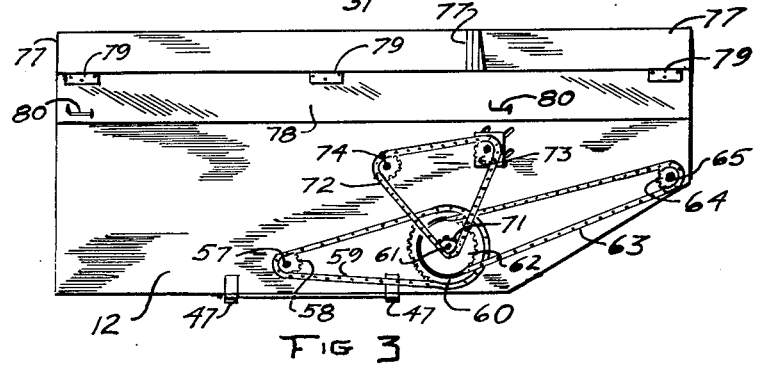
Figure 4:
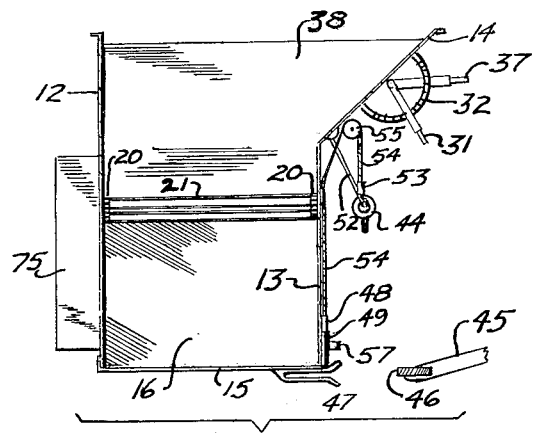
Figure 5:
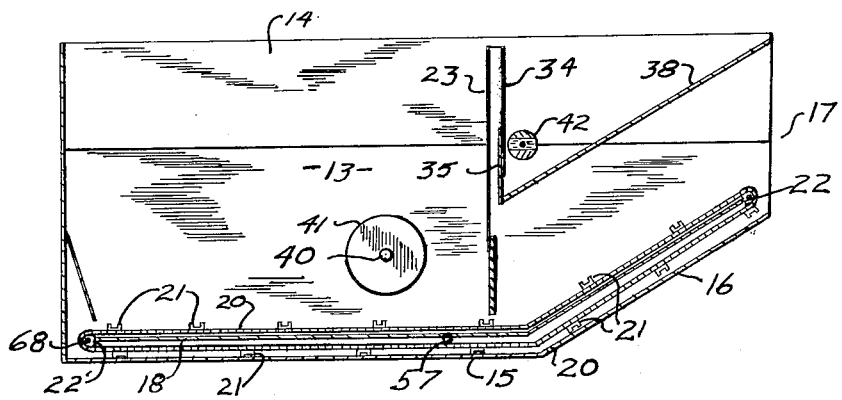
Figure 6:
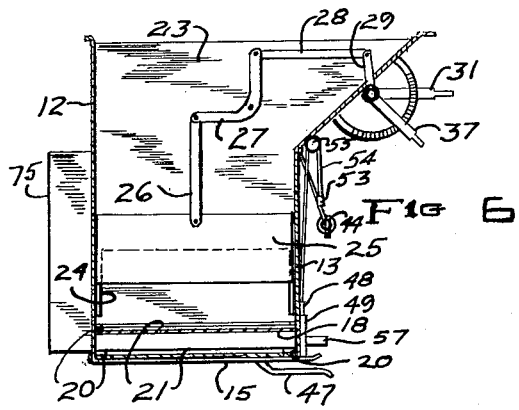
Figure 9:
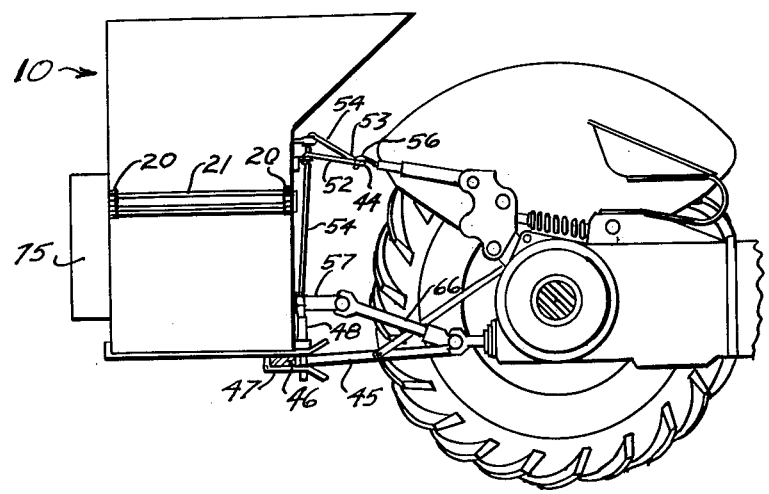

A complete understanding of my invention may be had from a study of the following specifications and the drawings in which:

FIGURE 1 is a front perspective view of my device,
FIGURE 2 is a top plan view of my device,
FIGURE 3 is a rear elevational view of my device having the chain cover removed to show the drive chains, and showing wall extensions in position,
FIGURE 4 is an end elevational view of my device,
FIGURE 5 is a sectional view along line 5—5 of FIGURE 2,
FIGURE 6 is a sectional view, in upright position, along line 6—6 of FIGURE 2 showing the feed gate in a raised position,
FIGURE 7 is a sectional view, in upright position, along line 7—7 of FIGURE 2 showing the supplemental feed gate in a raised position,
FIGURE 8 is a detailed fragmentary front elevational view showing the hitch mechanism, and
FIGURE 9 is a side elevational view of my device attached to the carrying tractor, one wheel being removed from the tractor.

Briefly my invention comprises a device for attachment to a tractor having a two- or three-point hitch, which device will carry amounts of two different types of feed in separate bins and will carry out measured amounts of both types or of either and deliver the feed to a bunk or trough as the tractor moves beside the bunk.

More specifically, and referring to the drawings, my device takes the form of a sheet metal bin 10 having a vertical end 11, a vertical back 12, a front formed of a vertical lower portion 13 and an outwardly sloping upper portion 14, and a bottom having a horizontal part 15 under most of the bin, but sloping upward at 16 toward an open end 17. As is best shown in FIGURE 5, a double bottom is used. The bottom of the bin which will support the feed to be carried is actually a false bottom 18, spaced from the real bottom 15—16.

A chain of flighting composed of two chains 20 parallel to each other connected by cross members 21 is disposed around the false bottom 18. The chains are carried by sprockets 22 and 22' at both ends of the false bottom and are therefore adapted to traverse this false bottom to move the cross members, and any feed carried thereby, across the bottom and out through the open end 17 of the bin.

At approximately the line where the bottom breaks upward, two intermediate walls are fixed transversely of the bin. The main bin wall 23 forms a closure for a relatively large hopper at one end of the device in which the principal feed being used is to be carried. The face of this wall is best shown in FIGURE 6. This wall is welded in place in the device and is spaced from the bottom just enough so that the feed transport flighting may move under it. An opening 24 extending nearly full width of the wall 23 is provided so that feed may be moved out of the hopper. This opening is provided with an adjustable closure in the form of a gate 25 slidably mounted on the wall so that it may be raised or lowered.

The mechanism for adjusting the gate 25 includes a gate link 26 pivoted to the gate 25 and also to a bell crank 27. The bell crank 27 is pivotally mounted on the wall 23 and is operated by an operating link 28 extending to a lever 29. This lever extends through an opening 30 in the front part 14, and is fixed to an operating lever 31. These levers are mounted pivotally on the outside of the bin and a sector 32 is provided over which the operating lever 31 moves and by engagement with which, the position of the lever is controlled. Such lever and sector arrangements are common in the art and no particular type has any particular advantage over any other. It will be evident that motion of the lever 31 will operate to adjustably position the gate 25 in the wall 23.

The supplementary bin wall 34 is best shown in FIGURE 7. It will be noted that this wall is spaced considerably farther from the bottom of the device than the wall 23 just described. Actually, as shown in FIGURE 5, the wall 34 ends just about at the top of the opening 24. Thus, if the gate 25 is fully open, sufficient clearance is provided under this latter wall 34 so that the flighting may carry as much feed under this wall 34 as can be carried through the opening 24 with the gate fully raised. The supplementary bin wall 34 is also provided with an opening 35, somewhat smaller than the opening 24 in the wall 23. This opening 35 is also closed by an adjustable sliding gate 36 operated by a mechanism similar to that for the first described gate, having a link 26' connected to a bell crank 27' operated by an operating link 28' and lever 29' in a manner exactly similar to the former described gate mechanism. The operating lever 37 for the supplementary bin gate 36 is adjustably engaged with the sector 32 for control of the opening of this gate also. It will be noted that the wall 34 is spaced from the wall 23 sufficiently to allow operating space for the gate mechanisms, and that this is sufficient to allow a supplementary feed to fall from the opening 35, onto the flighting or the load which the flighting might be carrying.

A sloping bottom wall 38 extends from base of the wall 34 approximately parallel to the sloping part 16. This wall is welded or otherwise fixed to the front wall 13—14 and rear wall 12 to form a supplementary hopper closed at one end by the wall 34 in which supplementary feed may be placed.

Agitator means to keep the feed loose and flocculent are provided in each hopper. In the main hopper, this means comprises a roller 40 having large end plates 41. This roller is journaled in the front wall 13 and rear wall 12 and is driven by means described hereinafter. It has been my experience that this simple means is sufficient to loosen the mass of feed in this hopper. In the hopper for supplemental feed, the agitator also comprises a drive roller 42. This hopper, however, is often used for ground ear corn feed which is more apt to bridge over the hopper. Also, there is no flighting moving underneath this hopper to keep the mass stirred. Therefore, I provide plates 43 which are not quite perpendicular to the roller and so wobble slightly as the roller turns. This causes the feed to be agitated and loose in this hopper also. The exact location of these agitator means within the hopper is not critical. However, the most satisfactory position seems to be near and slightly above the opening in each hopper.

As stated in the introduction, the device is adapted to be carried by a farm tractor. Particularly, it is adapted to be carried by a tractor having what is commonly called a "three-point" or a "two-point" hitch in which the tractor has a hydraulic system operable to raise or lower the implements used in conjunction therewith. In order to facilitate the carrying of the device I have provided an easy mode of connecting this to such a hitch. The lower two points of the usual three point hitch consist of a pair of links 45 movably connected to the tractor (not shown). For use with a two-point hitch, the connection is modified somewhat to provide for easy connection with the single lower point. A drawbar 46 is connected between the links, and consists of a flat piece of fairly heavy metal.

In order to connect my device to a tractor having the three-point hitch, I provide a pair of clevis-like devices 47 on the underside of my device. The drawbar 46 is adapted to slide between the legs of these clevises 47 thereby being in a position to support the entire device. In order to facilitate the engagement of the drawbar between the legs of clevis, I have curved the legs slightly outward to open the space between them at the entry. Alongside each clevis 47 and between them, I provide a pin 48 slidably mounted in a slide 49 fixed to the front wall 13 of my device. These pins are adapted to drop in front of the drawbar 46 while the drawbar is between the legs of the clevis 47 thus preventing withdrawal of the drawbar from the clevis. The third point of support on the tractor is well above the drawbar and to this is attached a support link 44 having an eye 50. This link may include a turn buckle 51 as shown. A hook 56 may be inserted through this eye to attach it to the tractor hitch in a manner well-known in the art. The link 44 is pivotally connected to a yoke 52 which in turn is pivotally mounted on the front wall 13. When not in use, the link 44 and yoke 52 drop to the position shown in FIGURE 8.

Automatic operation of the pins 48 may be provided by attaching a chain or cable 54 to the pin upwardly through a pulley 55 to a fastening bar 53 fixed to the yoke 52. By properly proportioning the length of chain and the point of its connection to the yoke, it is possible to provide for the pin to be pulled completely up and out of the path of the drawbar when the yoke is in its lower or dropped position and for the pin to be lowered in front of the drawbar when the yoke is held in an upward position by the connection of the link 44 to the tractor. Thus, anytime the link 44 is connected to the tractor, the pins 48 are in position to retain the drawbar 46 within the clevises 47.

My entire device is driven from the power take off shaft 66 of the tractor through a shaft 57 journalled in the front wall 13 and back wall 12 of my device at a position between the false bottom 18 and the real bottom 15. This shaft may be releasably connected to the power take off shaft of the tractor by the customary means used to make such connections on this type of tractor. As noted, this shaft 57 is journalled in the rear wall 12 and extends therethrough. A sprocket 58 is fixed to the shaft at the rear, and drives a chain 59 (FIGURE 3). The chain 59 in turn drives an idler sprocket 60 journalled on a fixed shaft 61 fixed on the rear wall 12. The idler sprocket 60 carries two drive sprockets. The main drive sprocket 62 drives a chain 63 extending toward the open end 17 of my device and in driving relationship with a sprocket 64 fixed to a shaft 65. This shaft extends across the bottom of the open end 17 and carries two flighting drive sprockets 22 which engage the chains 20. A similar shaft 68 and flighting sprockets 22' are provided near the closed end 11 as an idler shaft to carry the chains 20. Adjustment means of any type, well known in the art, may be provided on this idler shaft to hold the flighting at proper tension. Thus the power take off of the tractor is operably connected to the flighting to drive it in a direction which will carry the feed or other material in the hopper toward the open end 17.

The second drive sprocket 71 on the idler sprocket 60 also drives a chain 72 which is in driving relationship with a sprocket 73 fixed on the end of the supplementary bin agitator roller 42 and a sprocket 74 fixed on the end of the main bin agitator roller 40. Thus both agitators are also driven from the power take off of the tractor. The agitator in the supplementary bin may be adjustably mounted as shown to adjust the tension in the chain 72. This entire drive mechanism is preferably covered by a shield 75 to cover the operating mechanism and make the device more safe.

Normally, it is supposed that the device will rest on blocks or a stand or the like. In order to use it, it will be necessary merely to back the tractor up to the device, adjust the drawbar so that it will slip between the clevises 47. After the drawbar is properly engaged in the clevises, the link 44 is raised allowing the pins 48 to drop in front of the drawbar. After the link 44 is fastened to the upper hitch point on the tractor and the shaft 57 is drivingly engaged with the power take off shaft of the tractor, the device is ready to be moved. The hydraulic system of the tractor is used to raise my device from its stand so that the tractor may be moved to carry the device away.

The bins may be filled with feed while the device is on the stand or while it is on the tractor. Since it is easily portable, it is possible to take the device, position the large bin under a silage chute or grain chute and allow the feed to run into the bin. It will readily be seen that my device can be used for various types of feeds. Actually, I have used it with equal success using silage in the large bin and corn in the smaller, or using cracked or ground corn in the larger bin and a protein supplement in the smaller. However, in the event that a farmer has a pit silo, or a bunker silo, the device may still be easily filled. By backing the tractor into the pit or up to the bunker and dropping the hitch to its lowest position, the bin will be lowered to a point where the bin may be easily filled by hand.

It is envisioned that wall extensions 77 may be used in a manner well known in the art, to extend the front wall 14, end wall 11 and center wall 23. The rear wall 13 may also be extended similarly, but in order to preserve the ease of filling, I prefer to fasten the rear extension 78 to the back wall 12 by hinges 79 which may be bolted to the wall 12 so that the extension 78 may be dropped as shown in FIGURE 3. Any convenient type latch or hook 80 may be used to hold this extension 78 in its upper position latched to the extensions 77.

In use, after both bins are filled with the proper type feed, the device is carried by the tractor to a point adjacent to an animal feed bunk or trough so that the open end overhangs the trough. At this point, the power take off is engaged causing the shaft 57 to be driven. This in turn causes the flighting to be moved to carry feed through the open end 17 and to be dumped on the bunk. Meanwhile the positions of the main gate 25 and the supplemental gate 36 have been adjusted to provide the proper amount and proportion of flow. The tractor is then run alongside the trough so that the feed is deposited evenly therein. I have found that driving the tractor in reverse gives better steering control when it is necessary to deliver feed to bunks which are not in a straight line. However, it is obvious that it may be driven either forward or in reverse. The agitator rollers 40 and 42 are also driven by the power take off as noted hereinbefore and keep the masses of feed in their respective bins loose and flowing through the gates. Thus, the device will deliver an amount of feed to the bunk or trough which may be widely varied by varying the speed of the tractor, speed of the power take off, or the opening of the gates. The proportions may also be varied simply by changing the positions of the gates to allow more or less of a given type of feed to flow.

It will be apparent that by my invention I have provided a device for the transporting of livestock feed to a feed trough or bunk which is very flexible in its use, easily portable from one location to another, easily loaded, and inexpensive to build and operate.

Although I have described my invention in one embodiment, it will be apparent that numerous and extensive departures may be made therefrom without departing from the spirit and scope of my invention as limited only by the appended claims.

I claim:

1. For use with a tractor having a power-take-off drive, a raisable drawbar and an upper hitch point, means for transporting and dispensing livestock feed comprising bin means, clevis means on the bottom of said bin means adapted to embrace said drawbar, pin means slidably disposed on said bin means adapted to slide into holding engagement with said drawbar, upper connection means on said bin means adapted to be connected to said upper hitch point, said bin means being formed with one open end, feed carrrying means movably disposed in the bottom of said bin means adapted to carry feed toward and out of said open end, vertical dividing wall means in said bin means positioned to form a principal hopper in the part of said bin means remote from said open end, said wall means being formed with an opening therein near the feed carrying means so that feed from said principal hopper may be carried therethrough, gate means slidably disposed on said wall means, said gate means being thereby adapted to adjustably close said opening, operating means for said gate means operably connected thereto and including a lever projecting from said bin means toward said tractor whereby the operator of said tractor may adjust said gate means, sloping bottom wall and second vertical wall means in said bin means combining to form an auxiliary hopper, said second vertical wall means being substantially parallel with and adjacent to said first named vertical wall means, said sloping bottom and second vertical wall means having a common edge at a line slightly above the upper edge of said opening in said first-named vertical wall means, said second vertical wall means also being formed with an opening therein, said last named opening extending upward from said common edge, gate means adjustably connected to said second vertical wall means, said last named gate means being thereby adapted to adjustably close said last named opening, control means for said last named gate means and operably connected thereto including a second lever projecting from said bin means toward said tractor, agitator means in said principal hopper and agitator means in said auxiliary hopper and drive means adapted to be connected to said power take-off drive, said drive means being in driving engagement with both said agitators and said feed carrying means to drive them.

2. For use with a tractor having a power-take-off drive, a raisable drawbar and an upper hitch point, means for transporting and dispensing livestock feed comprising bin means, clevis means on the bottom of said bin means having legs slidingly embracing said drawbar, pin means slidably disposed on said bin means adjacent to said drawbar when said drawbar is embraced by said clevis means and slidable into engagement with said drawbar whereby said drawbar is held within said clevis means, upper connection means on said bin means adapted to be connected to said upper hitch point, said bin means being divided into a principal hopper and an auxiliary hopper, said hoppers both being formed to provide outlet openings, adjustable closure means disposed in said openings to adjustably control the size of said openings, and feed moving means movably mounted within at least one of said hoppers and extending through the outlet opening of that hopper whereby feed is moved therefrom, and drive means operably connected between said feed moving means and said power-take-off drive whereby motion is transmitted from said power-take-off drive to said feed moving means.

3. For use with a tractor having a power-take-off drive and a multi-point, movable-type hitch, means for transporting and dispensing livestock feed comprising bin means, attachment means on said bin means releasably attachable to said hitch, said bin means being formed with one open end, feed carrying means movably disposed in the bottom of said bin means adapted to carry feed toward and out of said open end, vertical dividing wall means in said bin means positioned to form a principal hopper in the part of said bin means remote from said open end, said wall means being formed with an opening therein near the feed carrying means so that feed from said principal hopper may be carried therethrough, gate means slidably disposed on said wall means adapted to adjustably close said opening, operating means for said gate means operably connected thereto and including a lever projecting from said bin means toward said tractor whereby the operator of said tractor may adjust said gate means, sloping bottom wall and second vertical wall means in said bin means combining to form an auxiliary hopper, said second vertical wall means being substantially parallel with and adjacent to said first named vertical wall means, said sloping bottom and second vertical wall means having a common edge at a line slightly above the upper edge of said opening in said first-named vertical wall means, said second vertical wall means also being formed with an opening therein, said last named opening extending upward from said common edge, gate means adapted to adjustably close said last named opening, control means for said last named gate means and operably connected thereto including a second lever projecting from said bin means toward said tractor, agitator means in said principal hopper and agitator means in said auxiliary hopper and drive means adapted to be connected to said power-take-off drive, said drive means being in driving engagement with both said agitators and said feed carrying means to drive them.

4. For attaching a bin to a tractor having a movable drawbar and an upper attachment point, attachment means on said bin comprising drawbar engagement means fixed to the lower part of said bin adapted to engage said drawbar whereby said drawbar will carry the weight of said bin, yoke means on the side of said bin adapted to be releasably attached to said upper attachment point, latch means on said bin adapted to hold said drawbar in engagement with said drawbar engagement means, and connector means engaged between said yoke means and said latch means to cause said latch means to be disengaged by movement of said yoke means when said yoke means is released from said attachment point.

5. The device of claim 4 in which the drawbar engagement means comprises at least one clevis-like means and said latch means comprises at least one pin slidably mounted on said bin adapted to hold said drawbar within the legs of said clevis-like means.

6. For attaching a bin to a tractor having a movable drawbar and an upper attachment point, attachment means on said bin comprising clevis-like means on said bin having legs adapted to straddle said drawbar, pin means slidably disposed on said bin adapted to slide to an engaged position wherein said drawbar is restrained in said clevis-like means, yoke means pivotally mounted on said bin having a raised position in which said yoke means is positioned for attachment to said upper attachment point, and a lowered position to which said yoke means drops when not attached to said attachment point, and flexible means connected between said pin means and said yoke means whereby said pin means are moved to said engaged position when said yoke means is moved to said raised position and whereby said pin means is moved out of said engaged position when said yoke means drops to said lowered position.

References Cited in the file of this patent

UNITED STATES PATENTS

| 1,423,649 | Daniel | July 25, 1922 |
| 2,267,526 | Kutscha | Dec. 23, 1941 |
| 2,774,495 | Reiger | Dec. 18, 1956 |
| 2,822,946 | Van Drisse | Feb. 11, 1958 |

FOREIGN PATENTS

| 92,573 | Norway | Oct. 6, 1958 |